(12) United States Patent
Xia et al.

(10) Patent No.: US 8,989,976 B2
(45) Date of Patent: Mar. 24, 2015

(54) METHOD AND APPARATUS FOR OPERATING A MULTI-MODE TRANSMISSION SYSTEM UNDER DYNAMIC CONDITIONS

(75) Inventors: Houchun Xia, Troy, MI (US); Robert L. Morris, Milford, MI (US); R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 13/494,072

(22) Filed: Jun. 12, 2012

(65) Prior Publication Data

US 2013/0332037 A1    Dec. 12, 2013

(51) Int. Cl.
*G06F 7/00* (2006.01)
*B60L 11/12* (2006.01)
*B60L 11/14* (2006.01)
*B60W 10/08* (2006.01)
*B60W 10/105* (2012.01)
*B60W 20/00* (2006.01)

(52) U.S. Cl.
CPC ............ *B60W 10/105* (2013.01); *B60L 11/123* (2013.01); *B60L 11/14* (2013.01); *B60W 10/08* (2013.01); *B60W 20/20* (2013.01); *B60W 20/50* (2013.01); *Y02T 10/6217* (2013.01); *Y02T 10/7077* (2013.01); *Y02T 10/7258* (2013.01)
USPC .......................................................... 701/58

(58) Field of Classification Search
CPC ............ G06F 7/00; G06F 17/00; G06F 19/00
USPC ...................................... 701/1, 51, 53, 58, 95
See application file for complete search history.

(56) References Cited

U.S. PATENT DOCUMENTS

| | | | |
|---|---|---|---|
| 7,645,206 B2 | 1/2010 | Holmes et al. | |
| 2004/0155613 A1* | 8/2004 | Sugiyama et al. | 318/254 |
| 2007/0225887 A1 | 9/2007 | Morris | |
| 2007/0225889 A1 | 9/2007 | Morris | |
| 2011/0029208 A1 | 2/2011 | Xia | |

* cited by examiner

*Primary Examiner* — Kim T Nguyen

(57) ABSTRACT

A method for controlling a multi-mode transmission system employing torque machines under dynamic operating conditions includes calculating a phase shift between a control parameter of one of the torque machines and a response parameter of the multi-mode transmission system under dynamic operating conditions, comparing the calculated phase shift and an expected phase shift, and executing remedial action when the calculated phase shift exceeds a threshold associated with the expected phase shift.

12 Claims, 4 Drawing Sheets

METHOD AND APPARATUS FOR OPERATING A MULTI-MODE TRANSMISSION SYSTEM UNDER DYNAMIC CONDITIONS

TECHNICAL FIELD

This disclosure is related to powertrain systems including a multi-mode transmission employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transmit torque originating from multiple torque-generative devices through a transmission device to an output member that may be coupled to a driveline. Such powertrain systems include hybrid powertrain systems and electric vehicle powertrain systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for controlling a multi-mode transmission system employing torque machines under dynamic operating conditions includes calculating a phase shift between a control parameter of one of the torque machines and a response parameter of the multi-mode transmission system under dynamic operating conditions, comparing the calculated phase shift and an expected phase shift, and executing remedial action when the calculated phase shift exceeds a threshold associated with the expected phase shift.

BRIEF DESCRIPTION OF THE DRAWINGS

One or more embodiments will now be described, by way of example, with reference to the accompanying drawings, in which.

DETAILED DESCRIPTION

Figure 1:
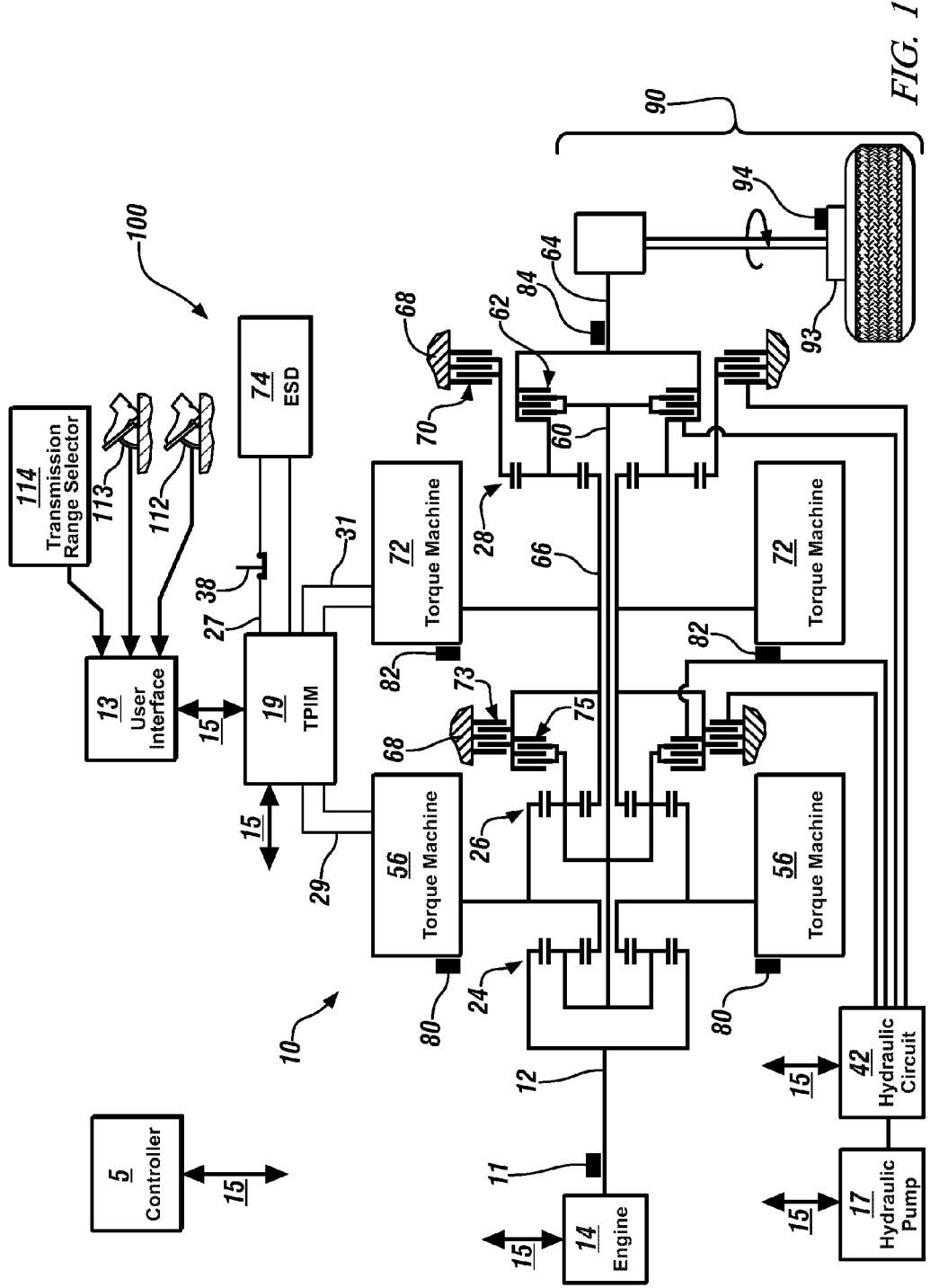
FIG. 1 illustrates a powertrain system including an internal combustion engine, a multi-mode electro-mechanical transmission, a driveline, and a controller in accordance with the disclosure.

Referring now to the drawings, wherein the showings are for the purpose of illustrating certain exemplary embodiments only and not for the purpose of limiting the same, FIG. 1 depicts a multi-mode powertrain system 100 that includes an internal combustion engine (engine) 14, a multi-mode transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred via the transmission 10 to the driveline 90.

The engine 14 may be any suitable combustion device, and includes a multi-cylinder internal combustion engine selectively operative in several states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches, and brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board routines, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. Each phase of each of the three-phase electric machines includes a pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system 100 via a communications link 15 to monitor and control operation of the powertrain system 100, including synthesizing information and inputs, and executing routines to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system 100. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system 100. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain system 100 is configured to operate in one of several states that can be described in terms of engine states including one of an engine-on state (ON) and an engine-off state (OFF), and transmission ranges including fixed gear, variable (EVT), and neutral modes, described with reference to Table 1.

TABLE 1

| Description | Engine State | Transmission Range | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |
| Neutral | ON/OFF | Neutral | — | |

The transmission ranges described in Table 1 indicate the specific applied one(s) of clutches C1 70, C2 62, C3 73, and C4 75 for each of the ranges. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Figure 2:
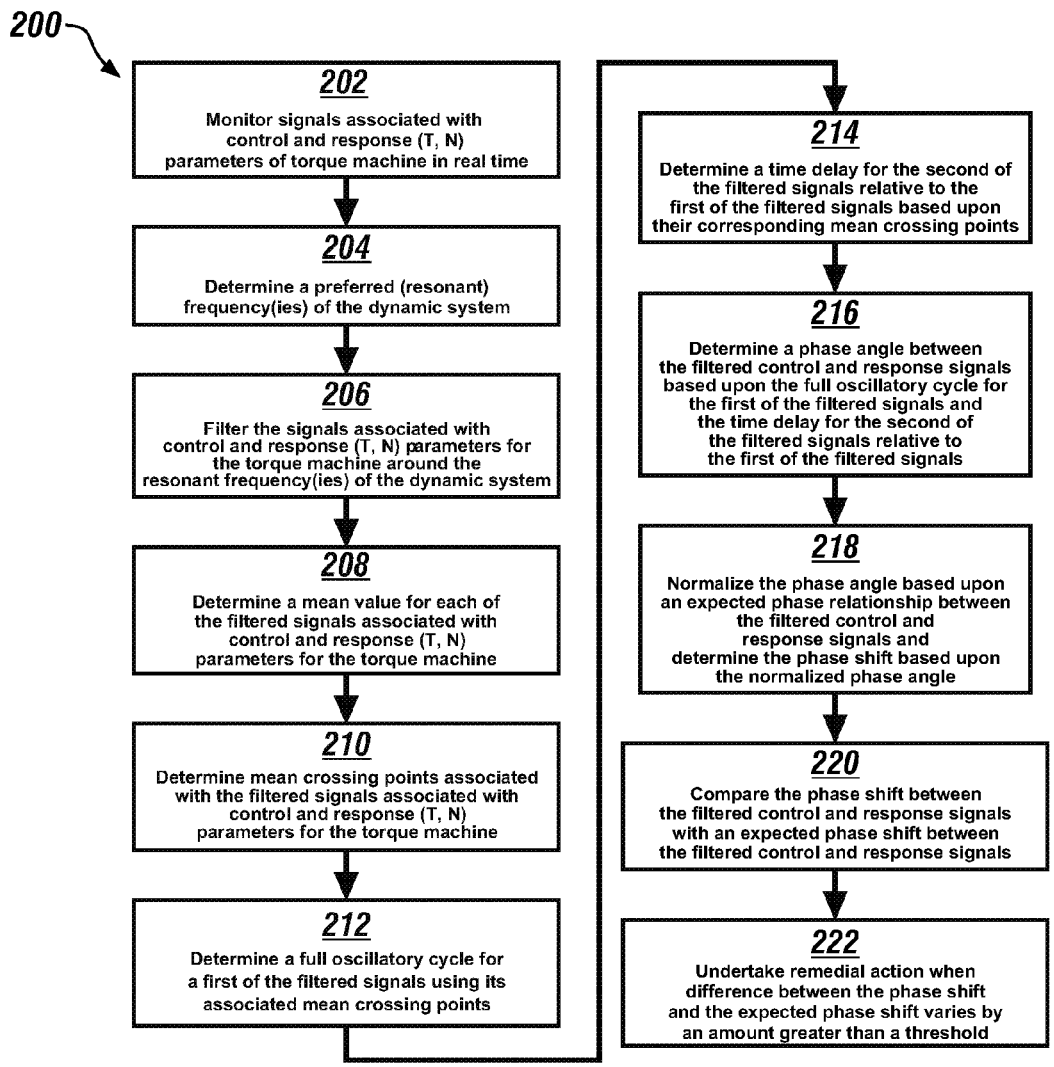
FIG. 2 illustrates operation of a control scheme to monitor operation of a powertrain system employing rotating torque machines under dynamic operating conditions in accordance with the disclosure.

FIG. 2 depicts operation of a control scheme 200 to monitor operation of a powertrain system employing a multi-mode transmission including rotating torque machines under dynamic operating conditions, including during operation that includes closed-loop speed control that may employ an active driveline damping control, and is described with reference to the powertrain system 100 of FIG. 1. The preferred operating parameters include a control signal, e.g., a torque command, and a response signal, e.g., rotational speed, for each of the torque machines, e.g., the first and second torque machines 56 and 72. The response signal from each of the torque machines represents the response of the powertrain system 100 at the location of the torque machine. A phase shift between a control signal for operating the torque machine and a corresponding response signal associated with operation of the powertrain system 100 is determined during dynamic operation. The phase shift is compared with a preferred phase shift between the control signal and the corresponding response signal. Some form of control or other remedial action is implemented when the phase shift differs from the preferred phase shift. Table 2 is provided as a key to FIG. 2 wherein the numerically labeled blocks and the corresponding functions are set forth as follows.

TABLE 2

| BLOCK | BLOCK CONTENTS |
|---|---|
| 202 | Monitor signals associated with control and response (T, N) parameters of torque machine in real time |
| 204 | Determine a preferred (resonant) frequency(ies) of the dynamic system |
| 206 | Filter the signals associated with control and response (T, N) parameters for the torque machine around the resonant frequency(ies) of the dynamic system |
| 208 | Determine a mean value for each of the filtered signals associated with control and response (T, N) parameters for the torque machine |
| 210 | Determine mean crossing points associated with the filtered signals associated with control and response (T, N) parameters for the torque machine |
| 212 | Determine a full oscillatory cycle for a first of the filtered signals using its associated mean crossing points |
| 214 | Determine a time delay for the second of the filtered signals relative to the first of the filtered signals based upon their corresponding mean crossing points |
| 216 | Determine a phase angle between the filtered control and response signals based upon the full oscillatory cycle for the first of the filtered signals and the time delay for the second of the filtered signals relative to the first of the filtered signals |
| 218 | Normalize the phase angle based upon an expected phase relationship between the filtered control and response signals and determine the phase shift based upon the normalized phase angle |
| 220 | Compare the phase shift between the filtered control and response signals with an expected phase shift between the filtered control and response signals |
| 222 | Undertake remedial action when difference between the phase shift and the expected phase shift varies by an amount greater than a threshold. |

Figure 3:
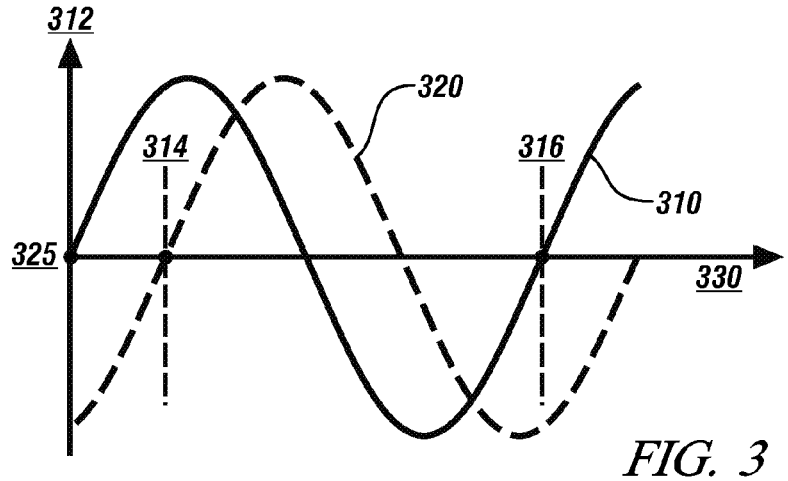
FIG. 3 illustrates modeled data associated with operation of a rotating torque machine including a command signal and a response signal in relation to time in accordance with the disclosure.

The operation of the control scheme 200 is described with reference to FIG. 3, which graphically shows modeled sinusoidal data including a first signal 310 and a second signal 320 in relation to time 330. It is appreciated that signals associated with control and response parameters of a torque machine in real time may have a non-sinusoidal form. However, the concepts described herein may be applied to any signal that is cyclical.

Operation includes monitoring signals associated with control and response parameters of the torque machine under dynamic conditions (202). The monitored signals preferably include a control parameter that is a torque command signal and a response parameter that is a rotational speed signal. The torque command signal and the rotational speed signal are cyclical, and may include a combination of a plurality of cyclical elements.

A preferred frequency of the dynamic system is determined, and is a resonant frequency of the electro-mechanical transmission 10 in one embodiment (204). Alternatively the preferred frequency of the dynamic system may be a resonant frequency of the powertrain system 100 including the engine 14, electro-mechanical transmission 10, and driveline 90 in one embodiment. There may be first and second preferred frequencies for the dynamic system, including a low frequency and a high frequency, each of which is associated with different operating parameters of the powertrain system 100. By way of example a low frequency may be associated with a first resonant frequency of the powertrain system 100 and a high frequency may be associated with a second resonant frequency of the powertrain system 100.

The torque command signal and the rotational speed signal are individually filtered in a frequency band(s) around the preferred frequency(ies) of the dynamic system (206). As previously described, the preferred frequency(ies) may include a low frequency associated with first resonant frequency of the powertrain system and a high frequency associated with second resonant frequency of the powertrain system. This filtering serves to remove high-frequency and low-frequency noise elements from the torque command signal and the rotational speed signal. The filtered rotational speed signal corresponds to the first signal 310 shown in the modeled data of FIG. 3 and the filtered torque command signal corresponds to the second signal 320 shown in the modeled data of FIG. 3.

A mean value for the filtered torque command signal is calculated, and a mean value for the filtered rotational speed signal is calculated (208). For purposes of illustration, the mean value for the filtered torque command signal and the mean value for the filtered rotational speed signal are coincidentally plotted as line 325 on FIG. 3.

The following steps describe an embodiment of a process to determine a phase angle between the torque command signal and the rotational speed signal. This includes determining mean crossing points associated with the filtered torque command signal and the filtered rotational speed signal (210). A full oscillatory cycle for a first of the filtered signals using its associated mean crossing points is determined, including a time for the full oscillatory cycle (212). A full oscillatory cycle for a second of the filtered signals using its associated mean crossing points may also be determined. The time for the full oscillatory cycle for the first of the filtered signals is shown between time points 312 and 316 on FIG. 3.

A time delay for the second of the filtered signals relative to the first of the filtered signals is determined based upon the corresponding mean crossing points for the first of the filtered signals and the second of the filtered signals (214). The time delay for the second of the filtered signals is shown as a time between the time points 312 and 314 on FIG. 3. A phase angle is calculated between the filtered control and response signals for the torque machine using the time for the full oscillatory cycle for the first of the filtered signals and the time delay for the second of the filtered signals (216). A normalized phase angle is calculated based upon an expected phase relationship between the filtered control and response signals, and a phase shift is determined based upon the normalized phase angle (218). The calculated phase angle between the filtered control and response signals for the torque machine is compared to an expected phase angle therebetween (220), and remedial action is undertaken to adjust the control parameter of the torque machine when a difference between the calculated and expected phase angles exceeds a threshold (222). By way of example the expected phase angle between the control signal for an electrically-powered torque machine and the response signal of a powertrain system is a phase shift of 180°.

Remedial action may include reducing output of or deactivating the active driveline damping control and controlling operation of the powertrain system 100 with only closed-loop speed control. Remedial action may include reducing gains on the closed-loop speed control system, or completely deactivating the closed-loop speed control system. Remedial action may include shutting down the powertrain system 100 under some circumstances.

Figure 4:
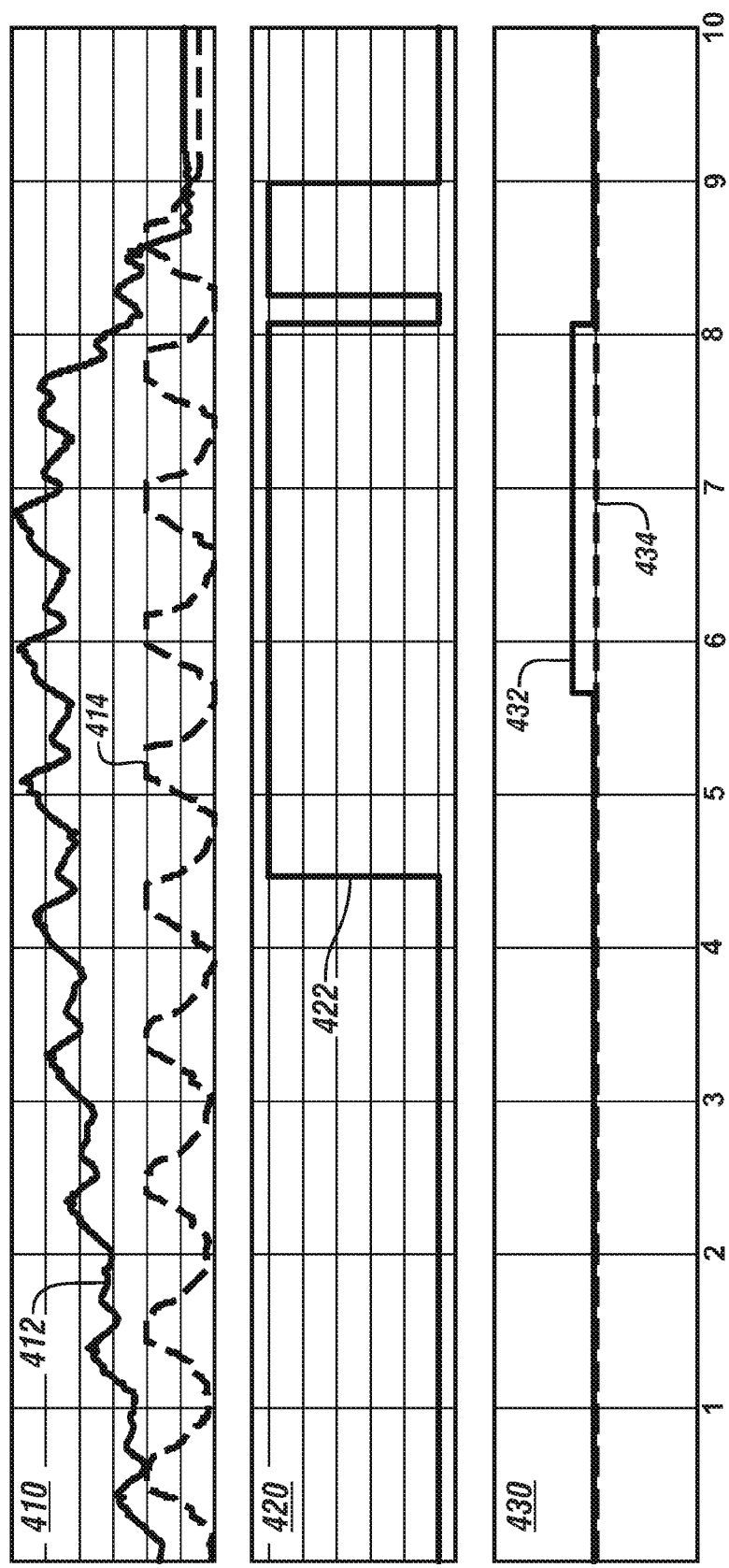
FIG. 4 illustrates a plurality of time-coincident datagraphs associated with operation of an embodiment of the powertrain system that is employing an embodiment of the control scheme in accordance with the disclosure.

FIG. 4 graphically shows a plurality of time-coincident datagraphs 410, 420, and 430 associated with operation of an embodiment of the powertrain system 100 that is employing an embodiment of the control scheme 200. The first datagraph 410 includes a speed response signal 412 that includes a low frequency element and a high frequency element. The datagraph 410 also includes a torque command signal 414 that includes the low frequency element as contained in the speed signal 412, which is generated in response to a closed-loop speed control scheme coupled with an active damping torque control scheme. The second datagraph 420 includes an oscillation detection flag signal 422 that is associated with the speed response signal 412. The third datagraph 430 includes a low frequency active damping control torque phase error flag signal 432 and a high frequency active damping control torque phase error flag signal 434. These results indicate that an oscillation of the speed response signal 412 is detected after some time, thus triggering the function to execute detection of an active damping control torque phase error. After a period of time, an active damping torque phase error is detected for the low frequency element and no active damping torque phase error is detected for the high frequency element. The datagraph 410 shows that the torque command signal 414 and the speed response signal 412 coincidentally emerge from their lowest points and fall back to their lowest points at the end of the low frequency cycle at the same time, which indicates that the phase shift between the torque command signal 414 and the speed response signal 412 is 0°. Thus, the torque command is pushing the speed oscillation, and the phase shift between the torque command and the speed response indicates an error.

Figure 5:
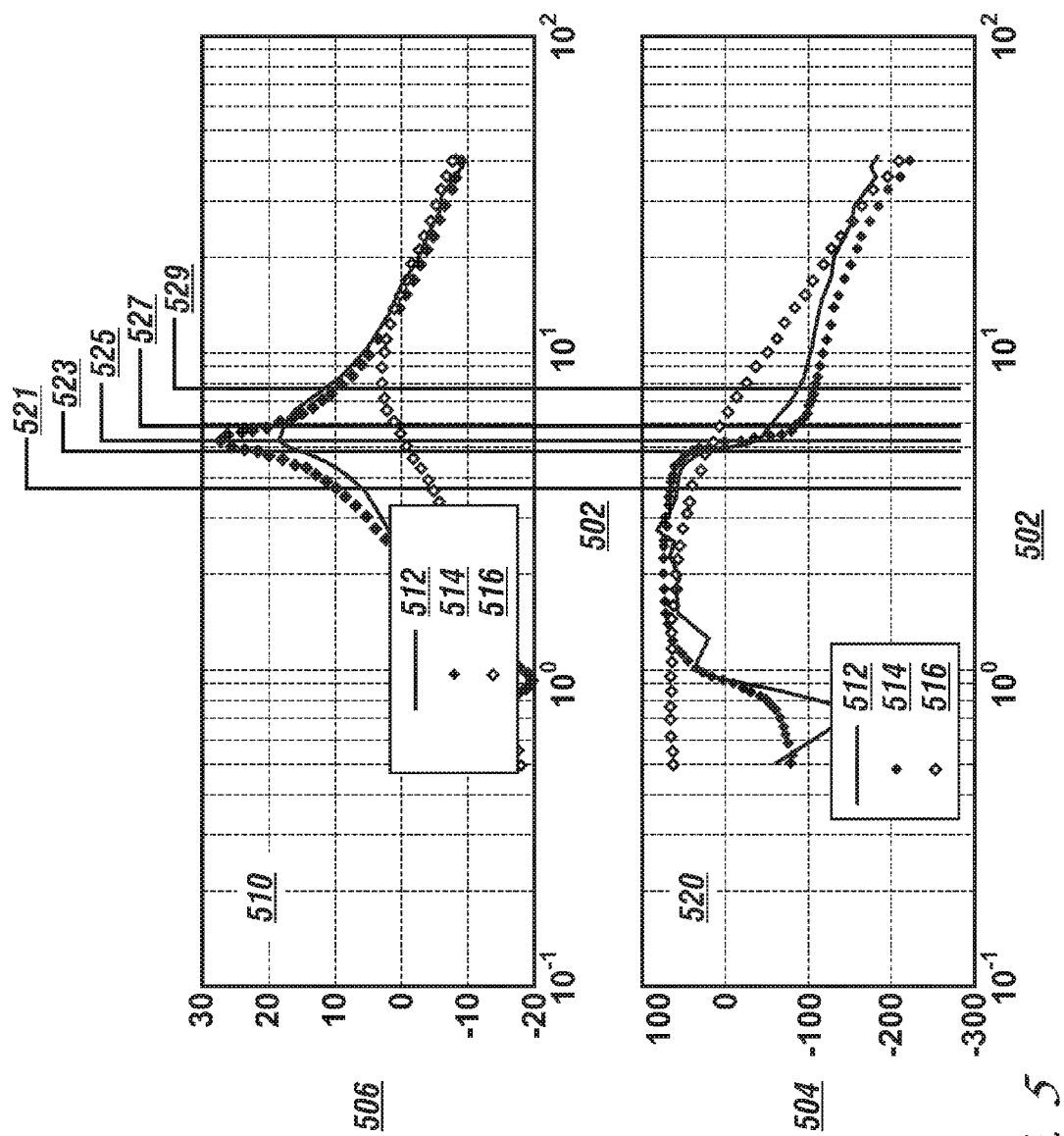
FIG. 5 illustrates frequency response curves for exemplary data of a powertrain system operating in an EVT mode in accordance with the disclosure.

FIG. 5 graphically shows frequency response curves 510 and 520 for exemplary data associated with a parameter of interest in operating a torque machine to control a powertrain system, e.g., one configured to generate torque in the powertrain system 100 described in FIG. 1 operating in one of the EVT modes. The x-axis 502 is frequency (Hz) plotted logarithmically, against absolute magnitude (db) 506 and phase angle (degrees) 504 for plotted data. The plotted data include data associated with operating the torque machine during a vehicle test 512, simulated data associated with operating the torque machine in an open-loop speed control 514, and simulated data associated with operating the torque machine in a closed-loop speed control 516. The frequency response curves 510 and 520 may be used to identify a resonant frequency of the powertrain system, which is indicated by data associated with line 525. The phase angle at a system resonant frequency theoretically equals zero as shown by the line 525 in plot 520. Lines 523 and 527 may be used to define a selective frequency region around the system resonant frequency for a zero phase angle. The phase angle relationship below and above this region has the values of −90° and +90°, respectively, for the system discussed here. This phase relationship may be used to normalize the phase angle calculated in block 216 in FIG. 2. Lines 521 and 529 may be used to define a region wherein the normalization in block 216 may be used. The analysis depicted herein may be reduced to routines implemented in software to evaluate operation of elements of the exemplary powertrain system 100 to detect shifts in the phase angle and undertake remedial action as described with reference to FIG. 2.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a multi-mode transmission system employing torque machines under dynamic operating conditions, comprising:
    calculating a phase shift between a control parameter of one of the torque machines and a response parameter of the multi-mode transmission system under dynamic operating conditions, comprising;
  monitoring a torque command for the torque machine and a rotational speed of the torque machine under the dynamic operating conditions;
  determining a resonant frequency of the multi-mode transmission system;
  filtering the torque command and the rotational speed around the resonant frequency of the multi-mode transmission system;
  determining a phase angle between said filtered torque command and said filtered rotational speed;
  normalizing said phase angle based upon an expected phase relationship between the torque command and the rotational speed; and
  determining the phase shift based upon the normalized phase angle;
comparing the calculated phase shift and an expected phase shift; and
executing remedial action when the calculated phase shift exceeds a threshold associated with the expected phase shift, including controlling the torque machine to operate with an adjusted control parameter.

2. The method of claim 1, wherein calculating the phase shift between the control parameter of one of the torque machines and the response parameter of the multi-mode transmission system under the dynamic operating conditions comprises:
  monitoring a torque command for and a rotational speed of the torque machine; and
  calculating the phase shift between the torque command and the rotational speed.

3. A method for operating a powertrain system including a multi-mode transmission, comprising:
  determining a phase shift between a control signal for operating a torque machine of the powertrain system and a corresponding response signal associated with the operation of the powertrain system during dynamic operation, comprising;
    monitoring signals corresponding to a torque command for the torque machine and an output speed of the multi-mode transmission;
    determining a resonant frequency of the powertrain system;
    filtering the signals corresponding to the torque command and the output speed of the multi-mode transmission around the resonant frequency of the powertrain system;
    determining a phase angle between said filtered signals corresponding to the torque command and said filtered signals corresponding to the output speed;
    normalizing said phase angle based upon an expected phase relationship between the torque command and the output speed; and
    determining the phase shift based upon the normalized phase angle;
  comparing the phase shift with an expected phase shift; and
  executing remedial action when the phase shift differs from the expected phase shift, including controlling the torque machine to operate with an adjusted control signal.

4. The method of claim 3, wherein executing remedial action when the phase shift differs from the expected phase shift comprises deactivating an active driveline damping control system.

5. The method of claim 3, wherein executing remedial action when the phase shift differs from the expected phase shift comprises reducing output of an active driveline damping control system.

6. The method of claim 3, wherein executing remedial action when the phase shift differs from the expected phase shift comprises reducing output of an active driveline damping control and controlling operation of the powertrain system only with a closed-loop speed control scheme.

7. The method of claim 3, wherein executing remedial action when the phase shift differs from the expected phase shift comprises reducing gains in a closed-loop speed control system.

8. A method for controlling a torque machine of a powertrain system including a multi-mode transmission, comprising:
  calculating a phase shift between a response signal of the powertrain system and a command signal for the torque machine during ongoing operation, comprising;
    monitoring the response signal comprising a rotational speed of an output member of the powertrain system and monitoring the command signal comprising a torque command for the torque machine;
    determining a resonant frequency of the powertrain system;
    filtering said torque command and said rotational speed around the resonant frequency of the powertrain system;
    determining a phase shift between the filtered torque command and the filtered rotational speed;
    normalizing said phase shift based upon an expected phase relationship between the torque command and the rotational speed; and
    determining the phase shift based upon the normalized phase shift;
  executing remedial action to control the torque machine when the phase shift exceeds a threshold, including controlling the torque machine to operate with an adjusted command signal.

9. The method of claim 8, wherein calculating the phase shift between the response signal of the powertrain system and the command signal for the torque machine during ongoing operation comprises:
  monitoring the response signal comprising a rotational speed of an output member of the powertrain system and monitoring a command signal comprising a torque command for the torque machine; and
  calculating the phase shift between the torque command and the rotational speed of the output member.

10. The method of claim 8, wherein executing remedial action to control the torque machine when the phase shift exceeds the threshold comprises reducing gains of an active driveline damping control system.

11. The method of claim 8, wherein executing remedial action to control the torque machine when the phase shift exceeds the threshold comprises deactivating an active driveline damping control and controlling operation of the powertrain system with a closed-loop speed control scheme.

12. The method of claim 8, wherein executing remedial action to control the torque machine when the phase shift exceeds the threshold comprises deactivating a closed-loop speed control system.

* * * * *